US008251624B2

(12) United States Patent  (10) Patent No.: US 8,251,624 B2
Tschantz et al.  (45) Date of Patent: Aug. 28, 2012

(54) INFLATABLE DUNNAGE BAG WITH PROTECTED INFLATOR VALVE

(75) Inventors: Michell C. Tschantz, Sandy Hook, CT (US); Jeffrey Goodner, Littleton, CO (US); Gregory E. Herivel, Westminster, CO (US); Vladimir Kroupa, Littleton, CO (US)

(73) Assignee: Inflatable Packaging, Inc., Newtown, CT (US)

( * ) Notice: Subject to any disclaimer, the term of this patent is extended or adjusted under 35 U.S.C. 154(b) by 1564 days.

(21) Appl. No.: 10/508,578

(22) PCT Filed: Mar. 12, 2003

(86) PCT No.: PCT/US03/07676
§ 371 (c)(1), (2), (4) Date: Mar. 22, 2006

(87) PCT Pub. No.: WO03/078251
PCT Pub. Date: Sep. 25, 2003

(65) Prior Publication Data
US 2006/0188356 A1  Aug. 24, 2006

Related U.S. Application Data

(60) Provisional application No. 60/363,914, filed on Mar. 12, 2002.

(51) Int. Cl.
*B61D 45/00* (2006.01)
(52) U.S. Cl. .................................................. 410/119
(58) Field of Classification Search .............. 410/117, 410/118, 119; 141/314, 10
See application file for complete search history.

(56) References Cited

U.S. PATENT DOCUMENTS

| 3,554,135 | A |   | 1/1971  | Duvall et al. ............... 105/369 |
| 3,730,240 | A | * | 5/1973  | Presnick ......................... 383/3 |
| 3,806,025 | A |   | 4/1974  | Marshall ..................... 229/62.5 |
| 5,254,074 | A | * | 10/1993 | Landers et al. .............. 493/213 |
| 5,447,235 | A |   | 9/1995  | Pharo ........................... 206/522 |
| 5,803,263 | A |   | 9/1998  | Pozzo ........................... 206/522 |
| 5,901,850 | A |   | 5/1999  | Jones et al. .................. 206/522 |
| 6,186,714 | B1 |  | 2/2001  | Berrier et al. ............... 410/119 |
| 6,579,584 | B1 | * | 6/2003  | Compton .................... 428/35.7 |
| 7,290,970 | B2 | * | 11/2007 | Deonarine .................. 410/119 |
| 2003/0094394 | A1 |  | 5/2003 | Anderson et al. ............ 206/522 |
| 2003/0139271 | A1 |  | 7/2003 | Vangedal-Nielsen et al. .............. 493/162 |
| 2005/0249570 | A1 | * | 11/2005 | Deonarine ................ 410/119 |
| 2006/0188356 | A1 | * | 8/2006 | Tschantz et al. ............. 410/119 |
| 2007/0056647 | A1 | * | 3/2007 | Frayne ........................ 137/843 |

FOREIGN PATENT DOCUMENTS

| JP |  | 11268771 A | * | 10/1999 |  |
| JP |  | 2000263681 A | * | 9/2000 |  |
| WO | PCT US1997/17472 |  |  | 4/1998 | .................. 206/522 |

* cited by examiner

*Primary Examiner* — H Gutman
(74) *Attorney, Agent, or Firm* — Ware, Fressola, Van Der Sluys & Adolphson LLP

(57) ABSTRACT

A dunnage bag is fabricated of thermoplastic sheet material joined together to form an air cushion including being joined to form an inflation panel edge seam. An inflation opening to the air cushion is defined between two layers of thermoplastic sheet material adjacent a terminus of the panel edge seam. Two layers of the thermoplastic sheet material extend from the inflation panel edge seam and inflation opening, and the two layers are joined together by an inflation panel seam pattern to form an inflation panel. The inflation panel seam pattern further defines an inflation area communicating with the inflation opening and with an inflation valve sealed to the inflation panel in the inflation area, for supplying inflation air from the inflation valve through the inflation panel and into the air cushion. The inflation area is preferably an elongated sinuous tube. This configuration protects the inflation valve and contributes to the integrity of the dunnage bag. The thermoplastic sheet material is substantially transparent, so that cargo inspections may be made without removing the dunnage bags.

17 Claims, 5 Drawing Sheets

INFLATABLE DUNNAGE BAG WITH PROTECTED INFLATOR VALVE

This application claims priority to our Provisional Application Ser. No. 60/363,914, filed on Mar. 12, 2002, entitled INFLATABLE DUNNAGE BAG WITH PROTECTED INFLATOR VALVE. This application is the U.S. National Stage of International Application No. PCT/US03/07676, filed on Mar. 12, 2003.

FIELD OF INVENTION

The invention herein relates to an inflatable dunnage bag with a protected inflation valve.

BACKGROUND OF INVENTION

Dunnage bags are very useful in protecting cargo during shipping. They are often used when shipping pallets of cargo by truck. The pallets are loaded into a trailer or cargo box, and the pallets are necessarily dimensioned so that they can be easily placed and removed. Thus, a certain amount of space remains between the pallets or between the pallets and the walls, such that the pallets can move around within the trailer or cargo box, and this in turn may cause damage to the goods or to the trailer or cargo box itself. Of course, this situation also pertains to other cargo, such as boxes, loose and free-standing cargo items, and to other cargo transportation, such as rail cars, containers and the like.

This situation is addressed by placing one or more inflatable dunnage bags between the pallets or other cargo, or between the pallets and the adjacent walls, and inflating the dunnage bags to fill the space and secure the palleted goods. Dunnage bags may also be used above the cargo to prevent cargo from bouncing, all with the purpose of having a securely packed and cushioned load.

Present dunnage bags are generally made of a multiple-ply lamination of heavy paper and a foil or plastic barrier. They generally have an inflation valve mounted in a wall of the dunnage bag, and the typical inflation valves are bulky and complex. For instance, one popular inflation valve has a lock-on fitting for receiving the mating fitting of an inflator hose, and a diffuser to prevent damage to the dunnage bag from high pressure inflation and from debris in the inflation air stream. These dunnage bags are sturdy and achieve acceptable cushioning. However, they tend to rub and chafe against the loads. This can impart a worn look to goods, as well as weaken the dunnage bag. Such dunnage bags are also expensive to make. They are bulky to ship to the point of use and bulky to store prior to use. The paper layers also tend to absorb moisture and odors. These dunnage bags also present a disposal problem because they are made of a combination of materials that cannot be recycled without separation, and are bulky waste items even after they are deflated.

The paper dunnage bags also present security issues, in that the dunnage bags are opaque and conceal whatever is behind them. When trucks and containers are opened at security checkpoints, inspectors should preferably be able to see the entire contents. If an inspector deems it necessary to deflate a dunnage bag in order to see the contents, provision must be made to replace or reinflate the dunnage bag at the checkpoint, or the contents will be unprotected.

In the course of developing the invention herein, it was recognized that an all thermoplastic dunnage bag would be compact for shipping to the point of use and for storage prior to use, would not absorb moisture and odors, and that an all thermoplastic dunnage bag would be easily recyclable after use. However, initial attempts to make an all plastic dunnage bag were not satisfactory, primarily because of difficulties in incorporating an inflation valve into the bag while maintaining the integrity of the bag.

Accordingly, it would be advantageous to have an improved dunnage bag that would overcome the disadvantages discussed above.

SUMMARY OF THE INVENTION

It is a principal object of the invention herein to provide an improved dunnage bag.

It is another object of the invention herein to provide a dunnage bag that is compact to ship and to store prior to use.

It is a further object of the invention herein to provide an improved dunnage bag that is easy to position and inflate.

It is an additional object of the invention to provide an improved dunnage bag that is sturdy and durable in use, and does not absorb moisture and odors.

It is yet another object of the invention to provide a dunnage bag that facilitates cargo inspection.

It is also an object of the invention herein to provide an improved dunnage bag that is easily disposed of, including by recycling.

In carrying out the foregoing objects of the invention, an inflatable dunnage bag is provided with a protected inflation valve. The dunnage bag is fabricated of thermoplastic sheet material joined along at least one inflation panel edge seam to form an inflatable dunnage bag with an air cushion for receiving inflation air. An inflation opening is formed between two layers of the sheet material and is partially defined by the at least one inflation panel edge seam. Two layers of the thermoplastic sheet material extend from the inflation panel seam and the inflation opening and are joined by an inflation panel seam pattern to form an inflation panel defining an inflation area. An inflation valve is inserted between the layers and sealed thereto to form an inlet to the inflation area. The inflation valve is adapted for receiving an inflator probe to deliver inflation air to the inflation area and into the air cushion of the dunnage bag. The inflation valve is self-sealing upon withdrawal of the inflation probe.

In one aspect of the invention, the inflation panel seam pattern defines an inflation tube extending through the inflation panel from the inflation valve to the inflation opening into the air cushion. The inflation tube is elongated and has a sinuous path along the inflation panel to provide the elongated length thereof within the inflation panel.

According to additional aspects of the invention, the thermoplastic sheet material is tube stock, although the invention is also applicable to forming the dunnage bag from two separate sheets. According to other objects of the invention, the inflation panel is provided adjacent the air cushion at a corner of the dunnage bag.

Also, according to aspects of the invention herein, the inflation valve is provided in two layers of thermoplastic material, which are self-sealing by the air pressure within the inflation tube. A mechanical sealing clip may be provided for additional sealing security.

According to additional aspects of the invention, the thermoplastic film used for fabricating the dunnage bag may be a monolayer of metallocene or other low density polyethylenes, may be a monolayer of mixed linear low density polyethylene and low density polyethylene, may be a monolayer of medium density polyethylene, and may be a co-extrusion of polyethylene and nylon, EVOH, or other barrier materials, where long-term air retention is a requirement. The thermoplastic film may also be laminates and cross-laminates of thermoplastic or thermoplastic and layers of other materials, including scrim. The thermoplastic sheet materials are substantially transparent, wherein the interior of the dunnage bag may be readily inspected by security personnel, and the cargo protected by the dunnage bags may also be seen.

The invention herein also relates to a method of making a dunnage bag, by making a transverse cut across a length of flattened tube stock of the thermoplastic sheet material, and cutting a portion of a folded side edge of the flattened tube stock adjacent to the transverse cut. A thermoplastic self-sealing flexible valve is inserted between two layers of the thermoplastic sheet material at the cut in the folded side edge of the tube stock, and is heat sealed in position with an entry end of the self-sealing flexible valve extending outwardly. A heated die is then applied to the tube stock to form a pattern of seams defining the air cushion of the dunnage bag, including an inflation panel edge seam segregating the air cushion from an inflation panel into which the self-sealing flexible valve is inserted. The seam pattern may also define an elongated inflation tube within the inflation panel connecting the self-sealing flexible valve with the air cushion of the dunnage bag.

According to further aspects of the invention, a transverse cut is made to separate the completed dunnage bag from the tube stock, the transverse cut also initiating the method of producing the next dunnage bag.

Other and more specific objects and features of the invention herein will be further suggested and appear in more detail in the following description of the preferred embodiments and the claims, taken together with the drawings.

BRIEF DESCRIPTION OF DRAWINGS

The same reference numerals refer to the same elements throughout the various Figures.

DESCRIPTION OF PREFERRED EMBODIMENTS

Figure 1:
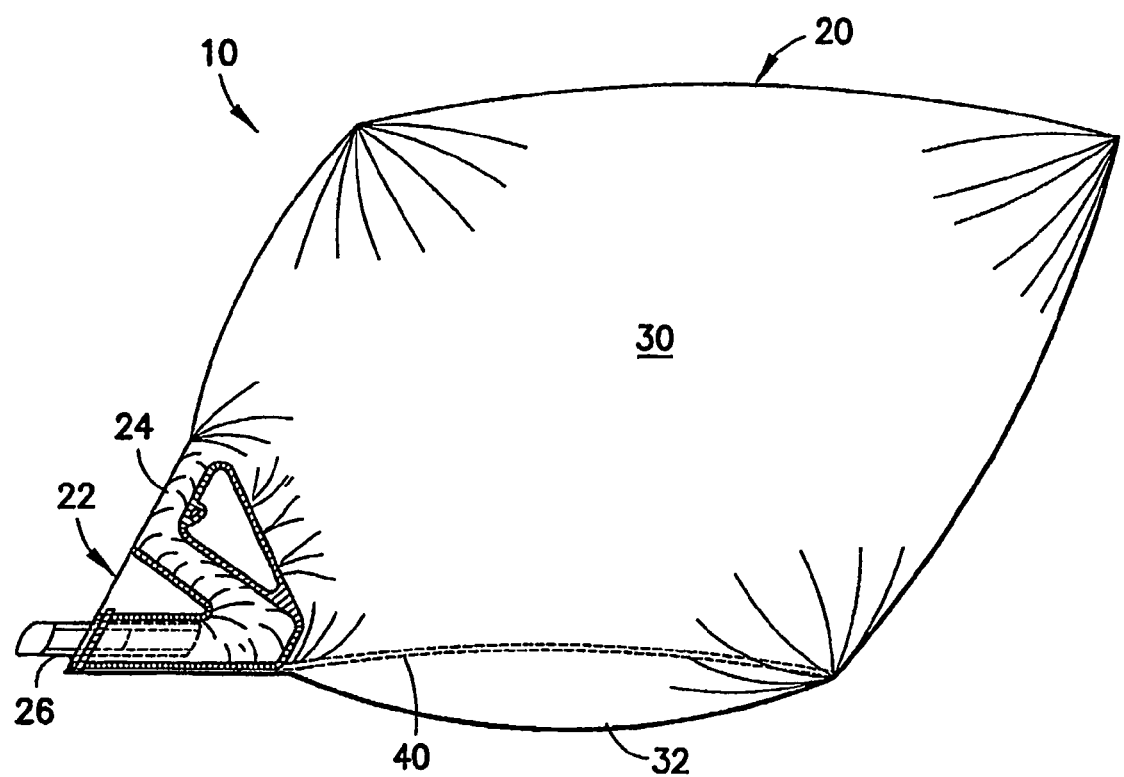
FIG. 1 is a perspective view of a dunnage bag according to the invention herein in its inflated condition.

A dunnage bag 10 according to the invention herein is illustrated in FIGS. 1-5. The dunnage bag 10 is generally comprised of an air cushion 20 and an inflation panel 22, which defines an inflation area 24, in the form of a sinuous inflation tube 24 in the embodiment shown, and mounts an inflation valve 26.

Figure 2:
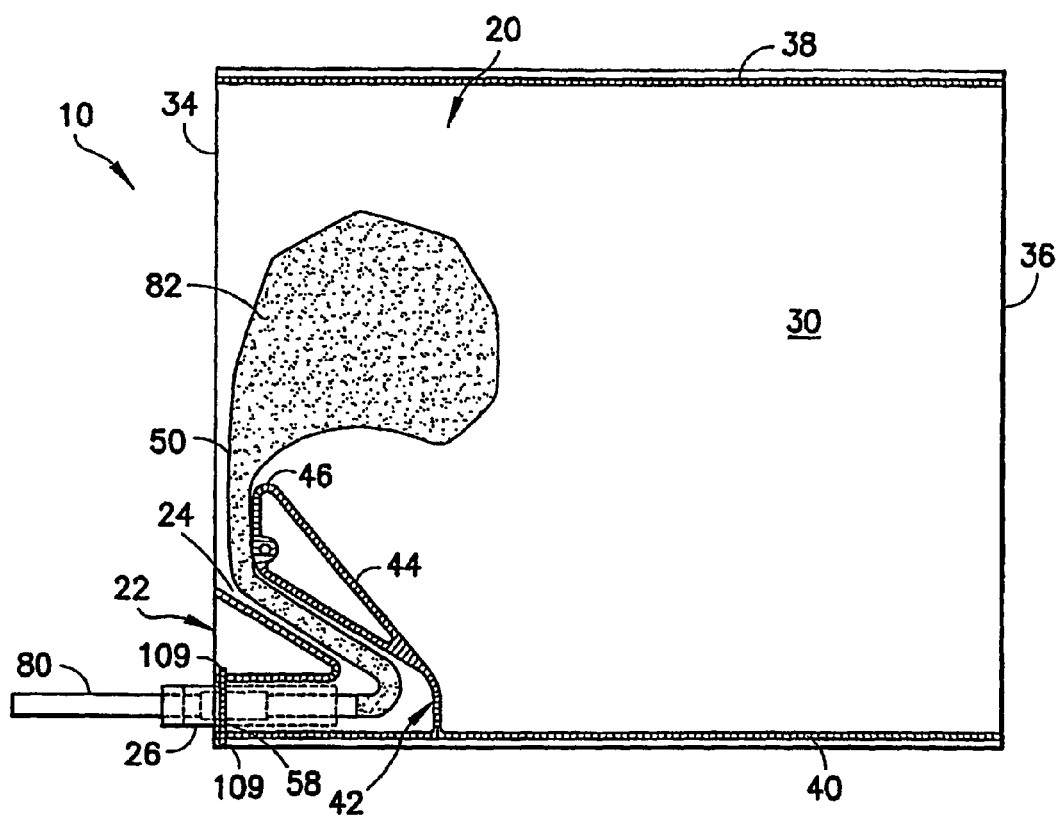
FIG. 2 is a plan view of the dunnage bag of FIG. 1, shown being inflated.
Figure 3:
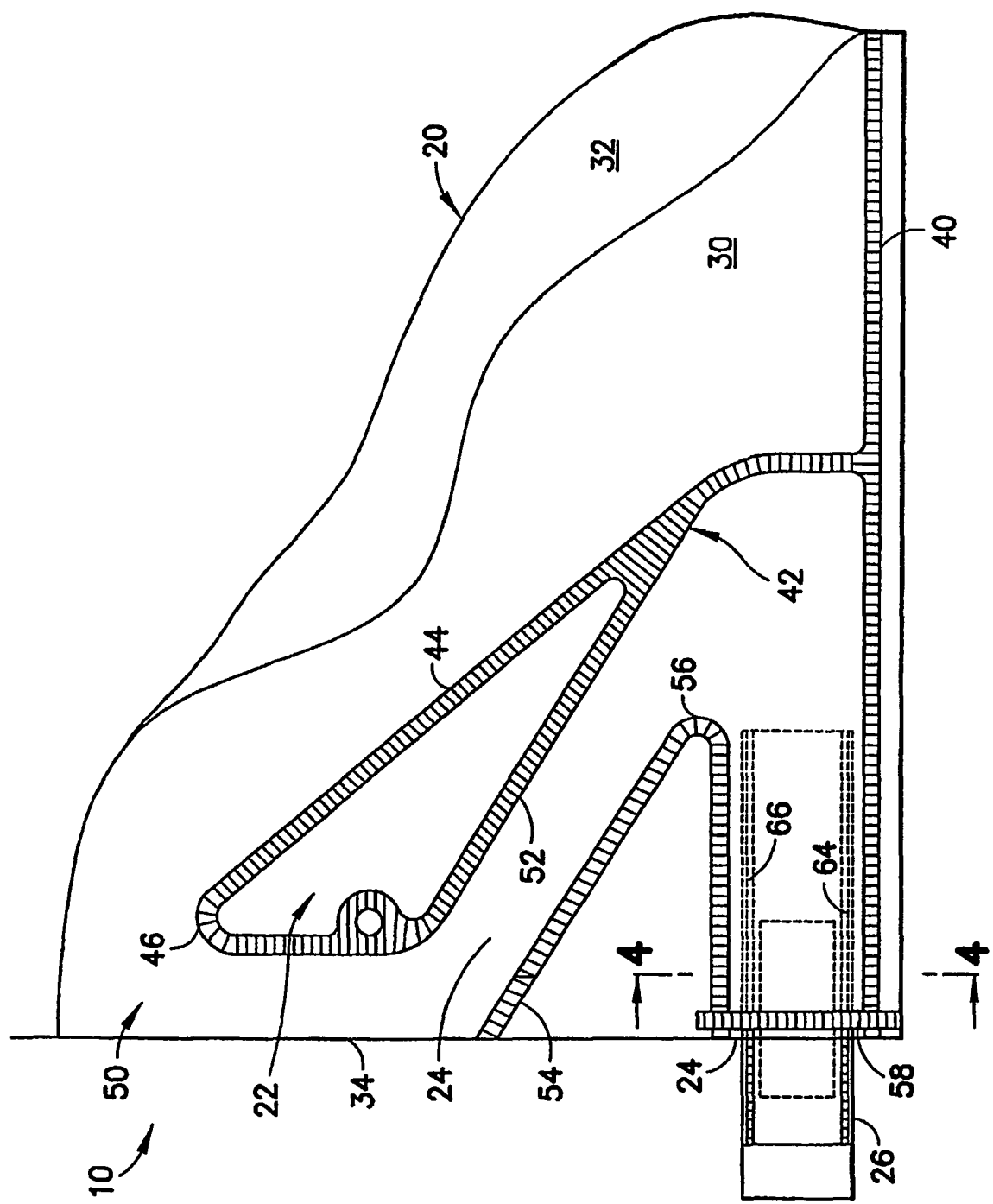
FIG. 3 is an enlarged segmental view of the dunnage bag of FIG. 1, showing the inflation panel and inflation valve thereof.

The dunnage bag 10 is fabricated of a thermoplastic sheet material provided as tube stock, wherein the dunnage bag 10 has a first layer or wall 30 and a second, opposed layer or wall 32 which are integrally joined at folded edges 34 and 36 when the dunnage bag is flattened as shown in FIGS. 2 and 3. The layers 30 and 32 are secured together at a first end seam 38 and a second end seam 40, and are further secured together by an inflation panel seam pattern 42, which also thereby forms the inflation panel 22 and the inflation tube 24. The air cushion 20 of the dunnage bag 10 is formed by the remaining, larger portion of the thermoplastic sheet material, i.e. the air cushion 20 is large with respect to the inflation panel 22 and inflation tube 24.

The inflation panel seam pattern 42 includes an inflation panel edge seam 44 extending from the end seam 40 toward the side fold 34, in a generally diagonal direction. The edge seam 44 ends at a sharply curved terminus 46, and an inflation opening 50 of the air cushion 22 is thereby defined between the terminus 46 and the side fold 34. Adjacent to the terminus 46, the inflation panel seam pattern 42 continues integrally with a first inflation tube side seam 52 of the inflation tube 24, which integrally rejoins the edge seam 44 adjacent to the end seam 40. The inflation panel 22 has a second inflation tube side seam 54, which extends from side fold 34 parallel to the first side seam 52 and curves at 56 to return to side fold 34 parallel to end seam 40. Thus, the seam pattern 42 defines a generally triangular inflation panel 22 adjacent to the air cushion 20, and the inflation panel 22 defines the inflation tube 24. The inflation tube 24 is elongated and extends in a curved or sinuous path from input end 48, where the inflation valve 26 is mounted, to inflation opening 50.

Figure 4:
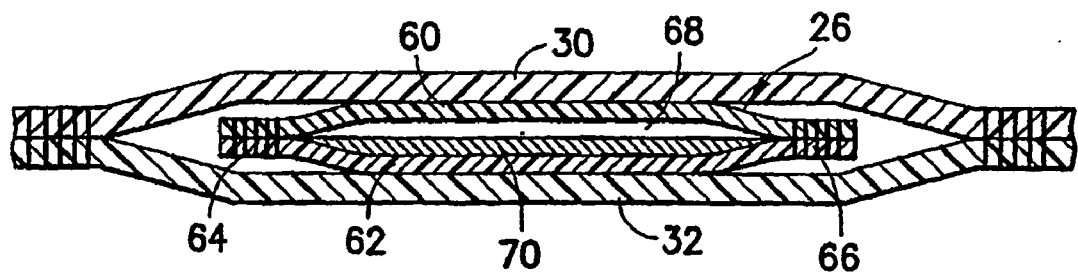
FIG. 4 is a sectional view of the inflation valve secured to the inflation panel, taken along the lines 44 of FIG. 3.

The self-sealing flexible valve 26 is well-known, and is shown in more detail in FIG. 4 to illustrate its application to the dunnage bag 10. The self-sealing flexible valve 26 is made from two layers 60 and 62 of co-extruded or laminated polyethylene and nylon, although it can be made from a single layer extrusion of suitable thermoplastic if so desired. The first and second layers 60, 62 of the valve are heat sealed together at seams 64 and 66 to define an inflation passage 68, shown barely open in FIG. 4. The sheet 62 has a heat resistant ink 70 printed thereon between the side seams 64 and 66, so that sheets 60 and 62 do not stick together when sheets 60 and 62 are heat sealed to the layers 30 and 32 of the dunnage bag 10, as is necessary to sealingly mount the valve 26 therein. With reference to FIG. 3, a seam 58 extends across the inflation valve 26 in the portion thereof having the heat resistant ink 70, thereby sealing the valve to the dunnage bag 10 and providing the inflation valve passage 68 through the valve. Seam 58 extends across both upper layer 30 and lower layer 32, i.e. it seals both layers 60, 62 of the valve to the dunnage bag 10.

Turning now to FIG. 2, the dunnage bag 10 is inflated by inserting a tubular probe 80 into passage 68 between the two layers 60 and 62 of the inflation valve 26, and introducing pressurized air to the inflation tube 24. The air, illustrated schematically at 82 of FIG. 2, flows through the inflation tube 24 to the inflation opening 50 of the air cushion 22 to enter and inflate the air cushion 20 of the dunnage bag 10. The air is preferably introduced at pressures of about 75 psi or less for a dunnage bag fabricated of 5 mils (0.005 inches) thick metallocene, so that the stream of inflation air does not damage the inflation panel.

Once the dunnage bag has been filled, the probe 80 is withdrawn and the layers 60, 62 of the inflation valve collapse together and are pressed together by the pressurized air within the dunnage bag. This closes the inflation valve 26 and maintains the inflation air within the dunnage bag. As is known in the art, it is sometimes desirable to provide an oil spray between the layers of the inflation valve 26, which achieves better sealing, and a sealing clip may also be placed across the protruding portion of the inflation valve, as a secondary seal.

The dunnage bag 10 is inflated to a pressure of approximately one-half to three pounds per square inch, which tightly stretches the sheet material forming the air cushion 10. Inflation pressure may vary according to the size, material and application of the dunnage bag. However, the limited size of the inflation opening 50 at the end of the inflation tube 24 and the length of the inflation tube 24 work to minimize the stretching and stress of the material in the area of the inflation valve 26, permitting the inflation valve 26 to maintain the integrity of its sealed connection in the dunnage bag 10, even when loads are applied to the exterior of the dunnage bag.

In developing the dunnage bag 10, prototypes were made with an inflation valve positioned directly on an end seam of the air cushion 20, and the prototype dunnage bags generally failed from separation in and around the inflation valve. Providing the dunnage bag with the inflation valve panel 22, including a relatively long inflation tube 24 separating the inflation valve 26 from the air cushion 20, resulted in a substantially more durable and reliable dunnage bag.

The inflation tube 24 may take other shapes than that shown, and is therefore also referred to as an inflation area connecting the inflation valve with the inflation opening 50 to the air cushion 20. The inflation area or tube 24 defined by the inflation panel 22 is small with respect to the air cushion 20, and communicates with the air cushion 20 through a defined inflation opening, such that the pressure loads on the air cushion do not act on the inflation valve 26 and the seams mounting it. Therefore, this arrangement of an inflation panel seam defining an inflation opening and inflation area or-tube to isolate the inflation valve from the air cushion contributes to the integrity of the dunnage bag.

The thermoplastic sheet material tube stock used to form the dunnage bag 10 is a monolayer of 5 mil (0.005") metallocene, a low density polyethylene. A range of from about 4 mils to about 10 mils is useful. Other suitable thermoplastic sheet materials include other low density polyethylenes, a monolayer mixture of linear low density polyethylene and low density polyethylene or a monolayer of medium density polyethylene. For applications where the air pressure must be maintained over a long period of time, it is desirable to use a co-extruded thermoplastic tube stock of polyethylene and nylon, EVOH or other barrier material. Laminations and cross-laminations of thermoplastic and other layers, including scrim, are also suitable. The thicknesses are provided appropriate to the material and intended use of the dunnage bag. It will further be appreciated that the dunnage bag 10 may be made from two layers of thermoplastic sheet material rather than tube stock, by providing two additional heat formed seams in place of the side folds 34 and 36.

Figure 5:
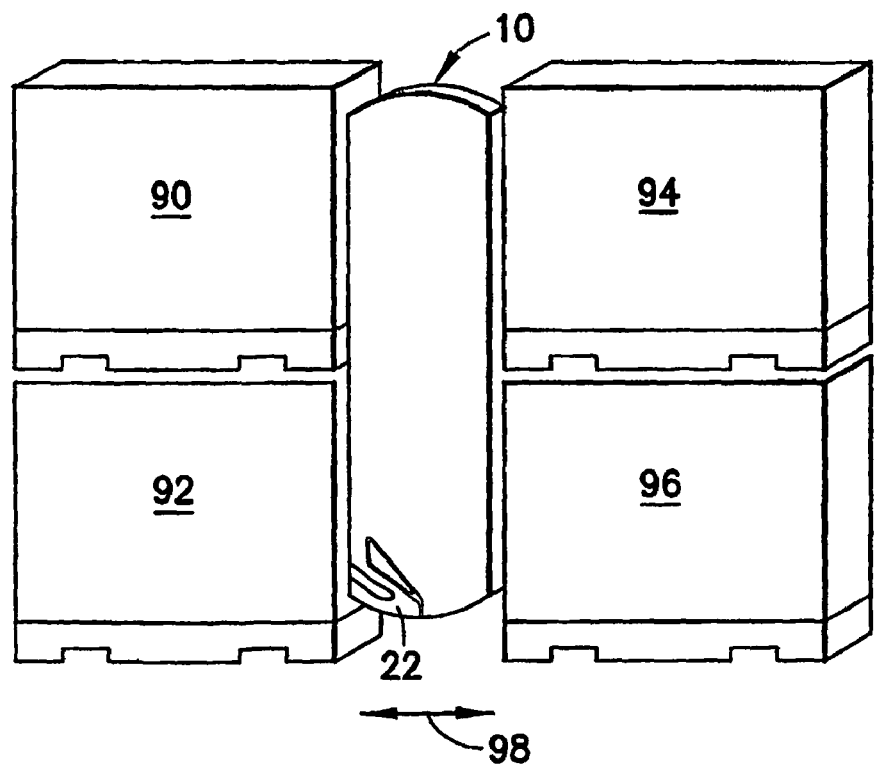
FIG. 5 is a diagrammatic view of cargo pallets and the dunnage bag of FIG. 1 being used to separate and cushion cargo pallets.

In FIG. 5, one use of the dunnage bag 10 is illustrated. A plurality of palleted loads 90, 92, 94 and 96 are shown stacked in twos and spaced apart by a void 98. It will be appreciated that the loads 90, 92, 94 and 96 would be placed in a trailer or cargo box of a truck, and that the sides of the loads opposite the void 98 would be butted against the sides of the trailer or cargo box.

The dunnage bag 10 is placed in the void 98 between unit loads 90, 92 and unit loads 94, 96 in its uninflated condition, and is inflated to fill the void 98 and restrain the unit loads from moving about within the trailer or cargo box. If desired, one or more additional dunnage bags can be placed on top of the stacked loads, and can be placed between the stacked loads and the end of the trailer, as required to stabilize the loads. The loads may have varying heights and depths, and the dunnage bags may be provided in a plurality of sizes to facilitate their use. It is convenient to provide dunnage bags in a 36"×48" dimension, a 36"×66" dimension and a 36"×80" dimension. Those dimensions are for a flattened dunnage bag 10 as illustrated in FIG. 2, and the 36" width dimension is typically the dimension of the width of the tube stock used to fabricate the dunnage bag.

Figure 6:
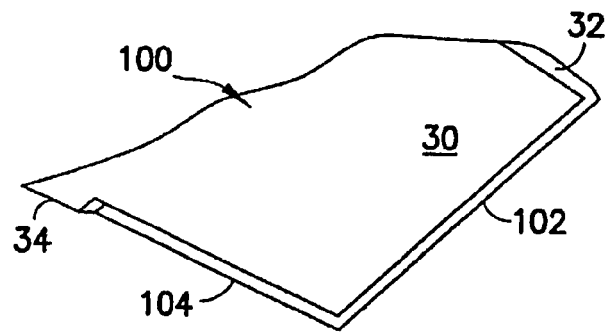
FIG. 6 is a perspective segmental view of a corner of thermoplastic tube stock sheet material having a portion of its folded edge cut away for making the dunnage bag of FIG. 1.
Figure 7:
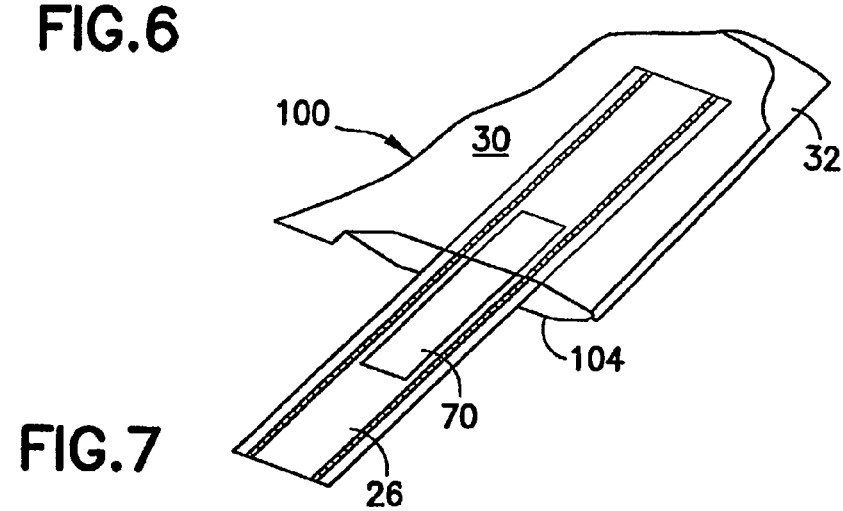
FIG. 7 is a perspective segmental view of the corner of the thermoplastic tube stock sheet material shown in FIG. 6 with a self-sealing flexible valve inserted therein.
Figure 8:
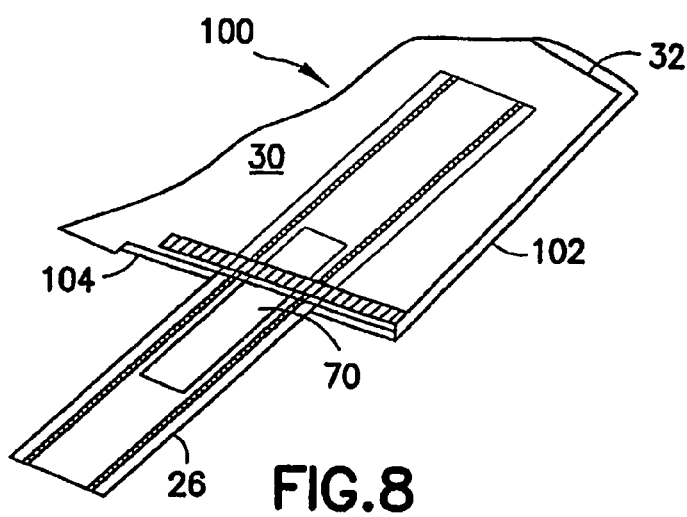
FIG. 8 is a perspective segmental view of the corner of the thermoplastic tube stock sheet material and the self-sealing flexible valve shown in FIG. 7, with the valve sealed between layers of the tube stock.

The method of fabrication of dunnage bag 10 is in part illustrated in FIGS. 6, 7 and 8, taken together with FIGS. 2 and 3. With reference to FIG. 6, the fabrication is carried out with flattened tube stock 100 having upper layer 30 and lower layer 32 extending from folded edge 34. The opposite folded edge 36 is not seen in FIG. 6. A transverse cut generally indicated at 102 extends across the tube stock from folded side edge 34 to the other folded side edge 36. The folded edge 34 is slit or cut away at 104 adjacent the transverse cut 102, providing access between layers 30 and 32 from the side of the tube stock.

With reference to FIG. 7, the inflation valve 26 is inserted between the sheets 30 and 32 at the cut 104 with the heat resistant ink 70 being positioned adjacent to the cut 102. As shown in FIG. 8, a heat sealed seam 58 is formed adjacent to the cut 104 and extending across the inflation valve 26 and more particularly across the portion of the inflation valve 26 on which the heat resistant ink 70 is printed. This secures both layers of the inflation valve 26 to the two layers 30, 32 of tube stock adjacent the cut end 102, but leaves the inflation passage 68 of the inflation valve 26 open because the heat resistant ink prevents sealing that passage.

The next step in fabricating the dunnage bag 10 is to apply a heated die forming the remainder of the seams illustrated in FIG. 2, namely the two end seams 38 and 40 and the inflation panel seam pattern 42. It will be noted that these seams cross the seam 58 to complete the sealing of the interior of the dunnage bag 10. A transverse cut may be made across the tube stock adjacent to the end seam 38 in order to separate the finished dunnage bag 10 from the tube stock and provide the transverse cut for the next dunnage bag. It will be appreciated that the end seams 38, 40 will be separated by the distance establishing the desired size of the dunnage bag 10.

The dunnage bag 10 may be retained in its flattened condition and folded, so that it is exceedingly compact to package and ship to the point of use, and takes a little storage area while awaiting use. One pallet may contain 1200 dunnage bags of the 24" by 36" size, at a weight of about 425 lbs., and one pallet may contain 600 dunnage bags of the 66" by 36" size at a weight of about 550 lbs. A typical truck trailer may require about 10 dunnage bags, so a single pallet can supply about 60-120 trailers.

The dunnage bags 10 are sufficiently light that a worker can carry ten or so bags into a trailer in one trip, and can easily position the bags prior to inflation. Once positioned, the dunnage bags are easily inflatable utilizing a probe. The position of the inflation valve 26 on the edge of the dunnage bag also facilitates inflation by providing good access to insert and remove the inflation probe.

The thermoplastic sheet material use in fabricating the dunnage bags 10 is very flexible, so that the dunnage bags conform well to loads. The thermoplastic sheet material also clings well to most loads, and clings especially well to palletized loads having thermoplastic shrink wrap securing the goods to the pallet. Because of the tendency to conform and cling to loads, the dunnage bags tend to hold their position well and chaffing between the dunnage bags and the loads is reduced. The thermoplastic sheet material (unless co-extruded or laminated with non-extensible materials) is sufficiently extensible and flexible that it can adapt to pressure changes and can absorb shock loads without rupturing.

Security is enhanced by the use of transparent thermoplastic sheet material in making the dunnage bags 10. An inspector can see the load that is being protected by the dunnage bags without removing them. In particular, an inspector can see that there is no contraband behind or even within the dunnage bags, which is a great benefit to inspectors and to shippers who might otherwise have their packing system dismantled in mid-trip.

The dunnage bags are easily deflatable as well. If it is not desired to re-use the dunnage bag, it may merely be slit and collapsed, and if it is desired to re-use it, a hollow pipe inserted in the inflation valve permits the air to be exhausted from the air cushion.

Generally, the dunnage bag is not re-used, and therefore it is merely slit to remove the air and then collapsed into a relatively compact form. Because it is made entirely of recyclable thermoplastic, it can be easily recycled without separation of materials or the like.

Accordingly, a dunnage bag has been described which admirably achieves the objects of the invention herein. It will be appreciated that the dunnage bag described above is a preferred embodiment and is merely illustrative of the invention, and that various changes may be made by those skilled in the art by those departing from the spirit and scope of the invention, which is limited only by the following claim.

The invention claimed is:

1. A dunnage bag comprising:
    A) thermoplastic sheet material joined together in two layers to form an air cushion and an inflation panel, including being joined to form an inflation panel edge seam separating the air cushion and the inflation panel;
    B) an inflation opening from the inflation panel to the air cushion, the inflation opening defined by and between the two layers of the thermoplastic sheet material forming the air cushion and the inflation panel, the inflation opening located adjacent a terminus of the inflation panel edge seam;
    C) the two layers of the thermoplastic sheet material extending from the inflation panel edge seam and inflation opening, and further joined together by an inflation panel seam pattern to form the inflation panel;
    D) the inflation panel seam pattern defining an inflation area between the two layers of thermoplastic sheet material in the inflation panel, the inflation area leading from an inlet through the inflation panel to the inflation opening to the air cushion; and
    E) an inflation valve sealed to the inflation panel at the inflation area inlet for supplying inflation air through the inflation area and into the air cushion, the inflation valve adapted for sealing the inflation area inlet after inflation.

2. A dunnage bag as defined in claim 1 wherein the inflation area is a tube defined within the inflation panel and extending from the inflation valve to the inflation opening.

3. A dunnage bag as defined in claim 2 wherein the inflation area tube has a sinuous path.

4. A dunnage bag as defined in claim 1 wherein the dunnage bag has a generally rectangular shape when it is flattened and uninflated.

5. A dunnage bag as defined in claim 4 wherein the inflation panel is located at a corner of the dunnage bag.

6. A dunnage bag as defined in claim 1 wherein the inflation valve comprises two layers of thermoplastic material defining an inflation passage, and a layer of heat resistant material extending across the passage so that the valve is heat fused to the thermoplastic material of the dunnage bag without closing the inflation passage.

7. A dunnage bag as defined in claim 1 wherein the dunnage bag is fabricated of thermoplastic tube stock and has side folded edges and heat sealed end seams.

8. A dunnage bag as defined in claim 7 wherein a portion of the side fold adjacent an end seam is slit to accommodate the inflation valve, and the inflation valve is inserted through the slit and heat sealed to the thermoplastic sheet material.

9. A dunnage bag as defined in claim 7 wherein the tube stock provides a width approximately 36" for the dunnage bag and a length in the range of about 36 to about 80 inches.

10. A dunnage bag as defined in claim 1 wherein the thermoplastic sheet material comprises low density polyethylene.

11. A dunnage bag as defined in claim 10 wherein the thermoplastic sheet material is comprised of metallocene.

12. A dunnage bag as defined in claim 10 wherein the thermoplastic sheet material has a thickness in the range of about 0.005 to about 0.010 inches.

13. A dunnage bag as defined in claim 1 wherein the thermoplastic sheet material comprises low density polyethylene co-extruded with another material.

14. A dunnage bag as defined in claim 1 wherein the thermoplastic sheet material is a laminate or cross-laminate including at least one layer of thermoplastic material.

15. A dunnage bag as defined in claim 1 wherein the thermoplastic sheet material is substantially transparent.

16. A dunnage bag comprising:
    A) thermoplastic sheet material joined together in two layers to form an air cushion and an inflation panel, including being joined to form an inflation panel edge seam separating the air cushion and the inflation panel;
    B) an inflation opening to the air cushion defined between the two layers of the thermoplastic sheet material adjacent a terminus of the inflation panel edge seam;
    C) the two layers of the thermoplastic sheet material extending from the inflation panel edge seam and inflation opening and further joined together by an inflation panel seam pattern to form the inflation panel;
    D) the inflation panel seam pattern defining an inflation area between the two layers of thermoplastic sheet material in the inflation panel, the inflation area leading from an inlet to the inflation opening to the air cushion; and
    E) an inflation valve sealed to the inflation panel at the inflation area inlet for supplying inflation air through the inflation area and into the air cushion, the inflation valve adapted for sealing the inflation area inlet after inflation, wherein the dunnage bag has a generally rectangular shape when it is flattened and uninflated and the inflation panel edge seam extends diagonally from an end seam of the dunnage bag to a terminus adjacent a side of the dunnage bag generally perpendicular to the end seam.

17. A dunnage bag as defined in claim 16 wherein the inflation area is a tube defined within the inflation panel and the inflation panel seam pattern further comprises:
    a) a first inflation tube side seam continuing from the inflation panel edge seam terminus generally parallel to a side of the dunnage bag and then away from the side toward an end seam of the dunnage bag,
    b) a second inflation tube side seam extending from the side of the dunnage bag generally parallel and spaced apart from the first inflation tube side seam, and then extending back to the side generally parallel and spaced apart from the end seam of the dunnage bag, and
    c) wherein the inflation valve is inserted in the side between the end seam and the second inflation tube side seam.

* * * * *